US005563665A

United States Patent [19]
Chang

[11] Patent Number: 5,563,665
[45] Date of Patent: Oct. 8, 1996

[54] VIDEO SIGNAL CONTROLLER FOR USE WITH A MULTI-SYNC MONITOR FOR DISPLAYING A PLURALITY OF DIFFERENT TYPES OF VIDEO SIGNALS

[76] Inventor: Darwin Chang, 20285 Pinntage Pkwy., Cupertino, Calif. 95014

[21] Appl. No.: 174,713

[22] Filed: Dec. 29, 1993

[51] Int. Cl.⁶ .................................................. H04N 5/262
[52] U.S. Cl. ........................ 348/552; 348/584; 348/600; 345/132
[58] Field of Search ................................ ; 348/552, 584, 348/600, 555–558; 345/132; 395/500; H04N 5/262, 5/46

[56] References Cited

U.S. PATENT DOCUMENTS

| | | | |
|---|---|---|---|
| 4,746,983 | 5/1988 | Hakamada | 358/183 |
| 4,774,582 | 9/1988 | Hakamada et al. | 358/183 |
| 4,855,813 | 8/1989 | Russell et al. | 358/22 |
| 4,899,139 | 2/1990 | Ishimochi et al. | 340/721 |
| 4,954,819 | 9/1990 | Watkins | 340/721 |
| 4,961,071 | 10/1990 | Krooss | 340/721 |
| 4,991,023 | 2/1991 | Nicols | 358/242 |
| 5,027,212 | 6/1991 | Marlton et al. | 358/183 |
| 5,065,143 | 11/1991 | Greaves et al. | 340/701 |
| 5,179,639 | 1/1993 | Taaffe | 395/128 |
| 5,189,401 | 2/1993 | Kugler, Jr. et al. | 345/132 |
| 5,276,458 | 1/1994 | Sawdon | 345/132 |

OTHER PUBLICATIONS

Advertisement on PC Sources, Mar. 1993, PC Primetime.
Advertisement on Personal Computing Tools, Oct.–Dec. 1992 Issue, p. 39, Desktop TV.

*Primary Examiner*—Victor R. Kostak
*Assistant Examiner*—Nathan J. Flynn
*Attorney, Agent, or Firm*—Limbach & Limbach L.L.P.; Ronald L. Yin

[57] ABSTRACT

A video signal controller is used with a dual sync monitor of a digital computer. The video signal controller has a tuner to generate conventional television signals. The signals from the tuner and from the computer are supplied to a multiplexer which switches between them and supplies the output signal to a dual sync monitor. The controller has three modes of operation. In a first mode, conventional television signals are displayed on the dual sync monitor. In a second mode, conventional computer signals are displayed on the dual sync monitor. Finally, in a third mode, multi video signals may be displayed to achieve, for example, picture-in-picture for display on the monitor. Finally, a method of processing the television signals for picture-in-picture display which greatly reduces the overhead required by the CPU is also disclosed.

30 Claims, 2 Drawing Sheets

VIDEO SIGNAL CONTROLLER FOR USE WITH A MULTI-SYNC MONITOR FOR DISPLAYING A PLURALITY OF DIFFERENT TYPES OF VIDEO SIGNALS

TECHNICAL FIELD

The present invention relates to a video signal controller having a tuner for generating a broadcast video signal and more particularly to a controller which can be used with a digital computer and a display device to display the video signal generated by the digital computer and the broadcast video signal generated by the tuner.

BACKGROUND OF THE INVENTION

Apparatuses to receive and display raster scan video signals as well as digital video signals are well known in the art. See, for example, U.S. Pat. Nos. 4,899,139; 4,954,819; 4,961,071; 5,027,212; 5,065,143; and 5,179,639. Microprocessor controlled monitors are also well known in the art. See for example, U.S. Pat. Nos. 4,746,983; 4,774,582; 4,855,813; and 4,991,023. In addition, prior art devices have taught the use of an add-on card for a PC computer with a tuner on the card. The tuner on the add-on card would receive "off the air" broadcast video signal and convert them into a raster scan-type signal. In addition, the card would then convert the analog raster scan signal into digital format and through the computer, the signals would then be displayed on the display monitor of the computer. The software executed by the computer permitted alternating the display of the video signal from the tuner as well as the video signal generated by the computer.

One of the drawbacks of the aforementioned prior art add-on card is that with the video signals supplied through the computer, much of the computing resources is consumed. In addition, because the scanning rate and the sizing for a raster scan video signal (such as that broadcast over the air) differs for a video signal which is the output of a digital computer, the display of both types of signals on a computer monitor has resulted in compromise in picture quality.

SUMMARY OF THE INVENTION

In accordance with the present invention, a video signal controller is used with a digital computer to control the display of the video signal which is the output of the digital computer and a raster scan-type video signal with optimal display for both types of signals, on a monitor. The video signal controller has a tuner for producing a raster scan video signal. A first multiplexer receives a first input video signal and a second input video signal and produces an output video signal which is supplied to the monitor. The output video signal is either the first or the second input video signal in response to a first control signal controlling the first multiplexer. The controller also comprises a first means for supplying a first video signal to the first multiplexer means as the first input video signal thereof. A second means supplies a second video signal to the first multiplexer means as the second input video signal thereof. Finally, a control means generates the first control signal supplied to the first multiplexer such that the monitor receives either the first video signal which is generated from the tuner or the monitor displays the second input video signal which is the output of the digital computer.

DETAILED DESCRIPTION OF THE DRAWINGS

Figure 1:
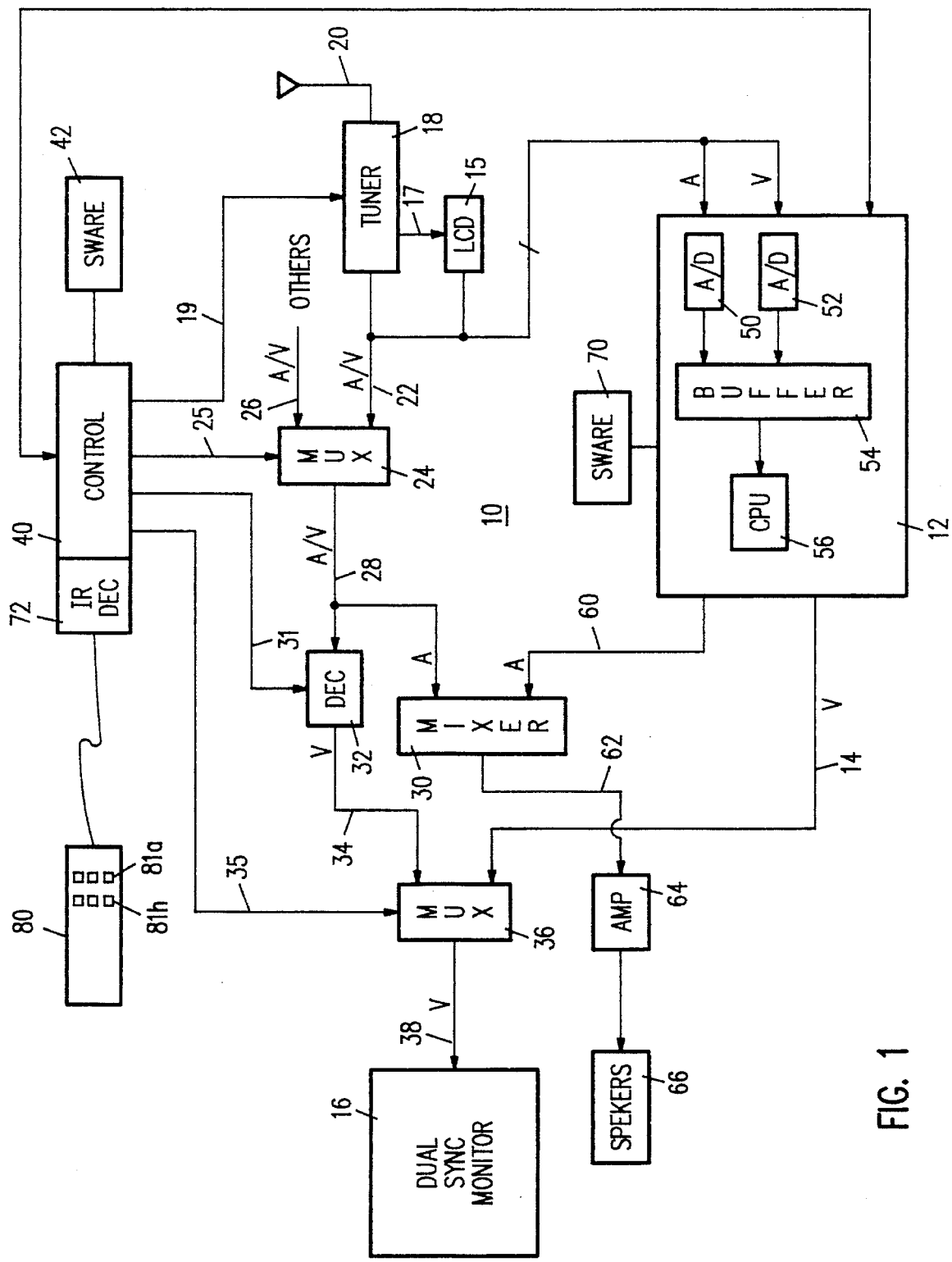
FIG. 1 is a schematic block level diagram of the apparatus of the present invention.

Referring to FIG. 1, there is shown a video signal controller 10 of the present invention. The signal controller 10 is particularly suitable for use with a digital computer such as an IBM PC compatible computer 12. In a preferred embodiment, the computer 12 generates a first video signal 14 having a well-known conventional format such as EGA, VGA, or Super VGA. The first video signal 14 is displayed on a dual sync or multi-sync monitor 16 also of conventional design, such as that from Sanyo Corporation. The dual sync monitor 16 is so named because its ability to display video signals having different sync rates.

The controller 10 comprises a conventional tuner 18 having an associated antenna 20 for receiving "off the air" broadcast video signals. The tuner 18 generates a second audio/video signal 22 which is supplied to a first multiplexer 24 along one input thereof. The second audio/video signal 22 received from the "off the air" broadcast is also of well-known standard, such as NTSC in the United States. In addition, the second audio/video signal 22 is supplied to a liquid crystal display 15, which can display the video signal portion of the second audio/video signal 22. The LCD display 15 is controlled by a control signal 17.

The first multiplexer 24 also receives as another input thereof a third audio/video signal 26. The third audio/video signal 26, has the same standard, e.g. NTSC, as the second audio/video signal 22, and can be from any other type of source, such as VCR, video disk etc. The output of the first multiplexer 24 is a fourth audio/video signal 28. The first multiplexer 24 receives a control signal 25. The control signal 25 causes either the second audio/video signal 22 or the third audio/video signal 26 to be supplied from the first multiplexer 24 as the fourth audio/video signal 28. The fourth audio/video signal 28 has its audio portion supplied to a mixer 30. The video portion of the fourth audio/video signal 28 is supplied to a decoder 32.

The decoder 32 is a single chip of conventional design, available from, for example Phillips TDA 3566A, to convert the received baseband video signal 28 to its component video signals, such as RGB. It is controlled by a control signal 31, which serves to control the chroma portion of the output RGB signal 34. The output of the decoder 32 is a fifth video signal 34. The fifth video signal 34, as a result of being operated upon by the decoder 32, would be a monitor signal such as RGB or YUV format.

The fifth video signal 34 is supplied to a second multiplexer 36. The first video signal 14 which is the output of the computer 12, and is in video monitor format, such as RGB, is also supplied to the second multiplexer 36. The output of the second multiplexer 36 is an output video signal 38 which is supplied to the dual sync monitor 16. The second multiplexer 36 is controlled by a control signal 35. The control signal 35 causes either the fifth video signal 34 or the first video signal 14 to be supplied from the second multiplexer 36 as the output video signal 38.

The tuner 18, the first multiplexer 24, the decoder 32, the LCD display 15, and the second multiplexer 36 are all under the control of a control 40. In the preferred embodiment, the control 40 is an Intel 8052 microcontroller, operating its associated software 42. A listing of the functional specifications for the software 42 is set forth hereinafter. The control 40 generates a control signal 19 to control the tuner 18 such as, to change channels, increase/decrease volume, adjust tint, etc. The control 40 also generates the control signal 17 to activate the LCD display 15 to display the signal 22. In addition, the control 40 also generates the control signal 25 that controls the first multiplexer 24 to output the fourth audio/video signal 28 as from either the second audio/video signal 22 or the third audio/video signal 26. The control 40 also controls the decoder 32 by adjusting the chroma signal portion of the output. Finally, the control 40 generates a control signal 35 which is supplied to the second multiplexer 36 and causes the output video signal 38 to be either the first video signal 14 or the fifth video signal 34.

The control 40 also communicates with the digital computer 12. In the case where the digital computer 12 is an IBM PC compatible computer, the control 40 communicates with the RS-232 serial port of the digital computer 12.

The second audio/video signal 22, which is the output of the tuner 18, is also supplied to the digital computer 12. In the preferred embodiment, an expansion card is added to the digital computer 12 in one of its expansion slots. The expansion card comprises a first analog-to-digital converter 50 which receives the audio signal portion of the second audio/video signal 22. The expansion card also has a second analog-to-digital converter 52 which receives the video signal portion of the second audio/video signal 22. The output of the first and second analog-to-digital converters 50 and 52 respectively are digital signals which are supplied to a buffer 54. The microprocessor 56 within the digital computer 12 accesses the buffer 54 (as will be explained in greater detail hereinafter). Finally, the digital computer 12, as previously stated, generates a first video signal 14 which is supplied to the second multiplexer 36 along one input thereof. In addition, the digital computer 12 generates an audio signal 60 which is also supplied to the mixer 30. The output of the mixer 30 is a composite audio signal 62 which is supplied to an amplifier 64. The output of the amplifier 64 is supplied to a plurality of speakers 66. In addition, the digital computer 12 executes its associated software 70. A copy of the functional specifications for the software 70 is set forth hereinafter.

Finally, the control 40 has an infrared (IR) decoder 72 which is responsive to a hand held, portable, remote unit 80, generating appropriate infrared signals.

There are three modes of operation for the system controller 10 of the present invention.

In the first mode, the tuner 18 generates the second audio/video signal 22 which is a broadcast video signal in a standard, such as NTSC. The control 40 controls the first multiplexer 24 such that the fourth audio/video signal 28 is the second audio/video signal 22. The video signal portion of the fourth audio/video signal 28 is then supplied to the decoder 32. The control 40 causes the decoder 32 to generate the fifth video signal 34. The fifth video signal 34 supplied to the second multiplexer 36 and the control 40 causes the fifth video signal 34 to be supplied as the output video signal 38. The output video signal 38 is then supplied to the dual sync monitor 16 for display.

In this mode, the dual sync monitor 16 displays the broadcast television signal from the tuner 18. The 15.75 kHz interlaced, overscanned, raster NTSC signal generated by the tuner 18, is received by the monitor 16 and is displayed on the monitor. Thus, the dual sync monitor 16 is perfectly sized to display the NTSC signal from the tuner 18. In addition, in this mode of operation, the control 40 through the IR decoder 72 is responsive to the infrared signals generated by the remote unit 80. The remote unit 80 has a plurality of key buttons 81 for entering data or commands. The control 40 is responsive to the infrared signal generated by the remote unit 80, as decoded by the IR decoder 72 to cause changes in the tuner 18. In this manner, the remote 80 functions as a conventional hand-held remote unit for a television device.

Moreover, the control 40 with its software, can cause the keys 81 on the remote unit 80 to be redefinable by the user, initially, or dynamically. Thus, each user of the system 10 can have his or her own favorite set of keys 81, defined in his or her own particular definition, such as particular buttons 81 to denote favorite pre-selected channels.

Through a single key on the remote unit 80, the video signal controller 10 of the present invention can enter into its second mode of operation. In the second mode of operation, the control 40 activates the control signal 35 to switch the second multiplexer 36. The output video signal 38 of the second multiplexer 36 is then from the first video signal 14 which is generated by the computer 12. Thus, in this second mode of operation, the video signal controller 10 permits the digital computer 12 to display its video signal, such as EGA, VGA or Super VGA, on the dual sync monitor 16 as if the digital computer 12 were operating in a stand alone mode of operation.

In addition, however, because the remote unit 80 transmits infrared signals to the IR decoder 72 which is received by the control 40, the signals from the remote unit 80 can be mapped by the control 40 to supply command to the digital computer 12 along its RS-232 serial input port. Thus, data or command can be supplied from the remote unit 80 to the digital computer 12 as if the remote unit 80 were a portable input device such as a portable keyboard.

Moreover, because the control 40 can interpret the IR signals generated by the remote 80 as decoded by the IR decoder 72, the control 40 can cause the keys 81 on the remote unit 80 to be redefinable by the user, initially, or dynamically. Thus, each user of the system 10 can have his or her own favorite set of keys 81, defined in his or her own particular definition as command or data keys for the digital computer 12.

Finally, in a third mode of operation, the controller 10 can display two video signals simultaneously in a number of different possible ways. In the first way, the tuner 18 can receive video signals from one channel and display that on the monitor 16, while simultaneously a video signal from another channel on the LCD display 15. This, of course, would require two tuners 16.

In another way, the computer 12 can be displaying its video signals on the monitor 16, while the video signals from the tuner 18 is displayed on the LCD display 15.

Finally, the second audio/video signal 22 can be supplied to the digital computer 12. The control signal 35 to the second multiplexer 36 is switched such that the output video signal 38 to the dual sync monitor 16 is supplied from the first video signal 14 from the digital computer 12. However, because the second audio/video signal 22 is also supplied to the digital computer 12, the second audio/video signal 22 is digitized and is placed in the buffer 54. Thereafter, the CPU 56 of the digital computer 12 can retrieve the data from the buffer 54 and place it as a "window" in a location within its display, thereby accomplishing a "picture-in-picture" (P-I-

P) display. However, unlike conventional, prior art P-I-P displays, wherein two signals having the same format, e.g. two NTSC signals are displayed on the same screen, or two digital signals forming windows for a digital computer display, in this mode of operation, two video signals having different standards are displayed in a P-I-P format.

In yet another variation, one channel of the second audio/video signal 22 can be supplied to the digital computer 12. The control signal 35 to the second multiplexer 36 is switched such that the output video signal 38 to the dual sync monitor 16 is supplied from another channel of video signal from the tuner 18. The one channel of video signals from the audio/video signal 22 is digitized and is placed in the buffer 54. Thereafter, the CPU 56 of the digital computer 12 can retrieve the data from the buffer 54 and place it as a "window" The mux 36 can be continually switched back and forth to accomplish the prior art technique of displaying a broadcast picture-in-broadcast picture.

Figure 2:
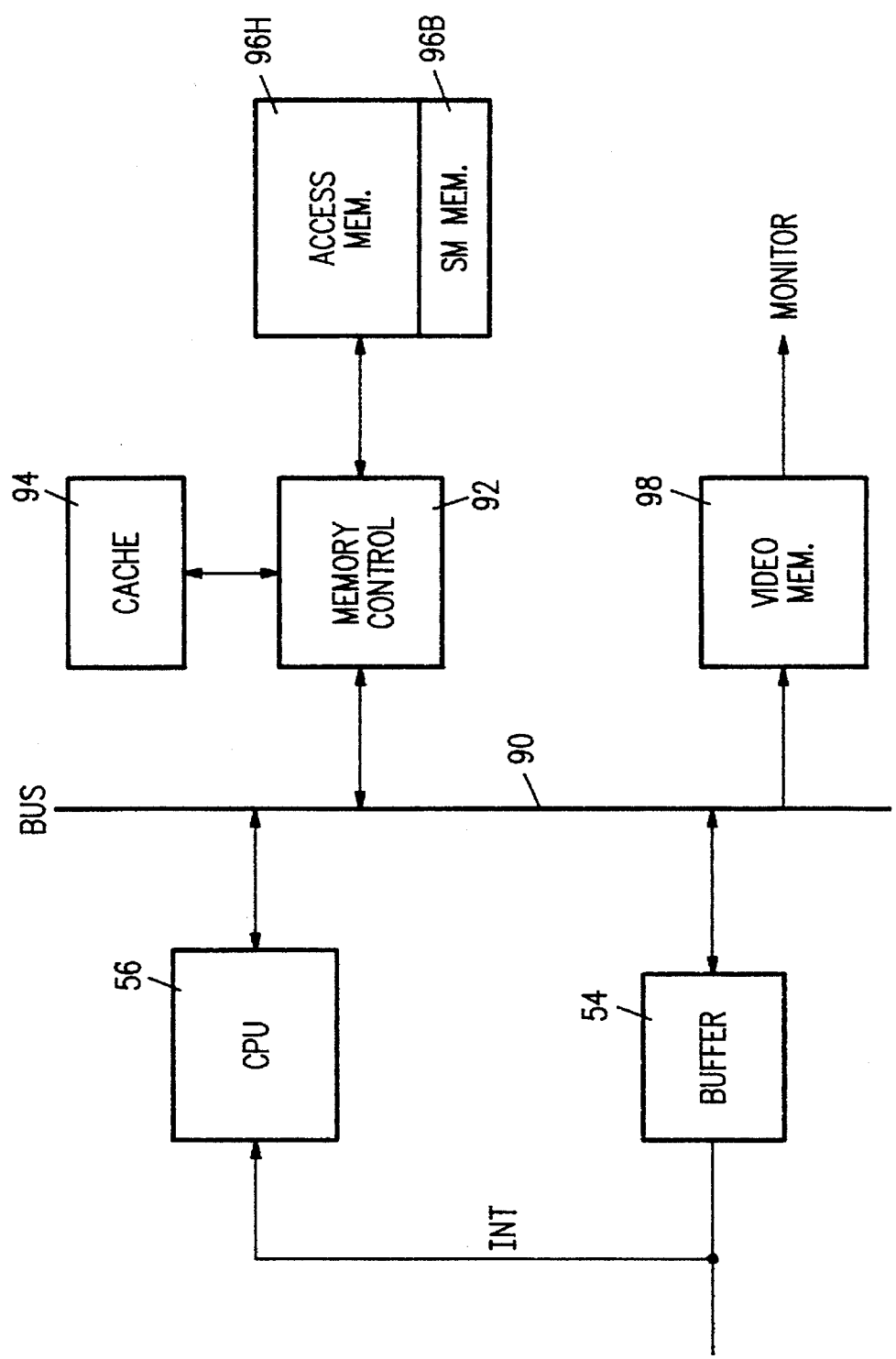
FIG. 2 is a block level diagram showing another aspect of the present invention wherein the digital computer is optimally controlled to respond to the video signals supplied thereto.

Another aspect of the present invention is the particular manner in which the P-I-P display is accomplished. In the preferred embodiment, the CPU 56 is an Intel or Intel-compatible X86 processor, where X86 is preferably of the type 386 or 486. These processors 56 have four modes of operation: real, virtual, protect, and system management. Referring to FIG. 2, there is shown a block level diagram of the typical components of the digital computer 12. The CPU 56 and the buffer 54 are connected to and communicate with an internal bus 90 of the computer 12. In addition, a memory control unit 92 communicates with the bus 90. The memory control 92 controls a main memory 96 comprises an access memory portion 96a and a system management memory portion 96b. In addition, the memory control 92 communicates with a cache memory 94. Finally, a video memory 98 communicates with a bus 90 and supplies the necessary video signals to the video monitor 16.

In the prior art, when the computer 12 is operational, it executes an operating system program such as MS DOS (available from Microsoft Corporation) and Windows (also available from Microsoft Corporation). These operating system programs are stored in the access memory 96a portion of the main memory 96. Typically, the Windows program causes the video memory 98 to contain a display to be displayed on the monitor 16 showing various "windows" or application programs that are operational. The application programs operating under the Windows environment are also stored in the access memory portion 96a of the main memory 96.

In the prior art, as the buffer 54 is filled with video data generated by the tuner 18, periodically, an interrupt signal is generated and is transmitted to the CPU 56. The interrupt signal typically, can be generated after one raster scan full of data and is based upon the sync signal. Since the CPU 56 is executing an application program under the Windows environment, the CPU 56, would seek an instruction from the application program that is designed to handle the interrupt by sending a signal to the bus 90, through the memory control 92 and into the access memory 96a. The instruction from the application program in 96a is then retrieved back through the memory control 92 through the bus 90 and into the CPU 56. The instruction is then processed. However, since the application program is running under the Windows environment, the particular instruction, for example, if it is to service the data in the buffer 54 by moving it into the video memory 98, must again be passed into the Windows operating instruction environment. The CPU 56 would then send a signal, to the bus 90, through the memory control 92 and into the access memory portion 96a into the portion of the Windows program residing in the access memory 96a and retrieve an instruction therefrom. The instruction retrieved from the Window program must be passed back through the memory control 92 through the bus 90 and into the CPU 56 for execution. Each byte of data in the buffer 54 must be operated upon in this manner, i.e. by going entirely through the application program into the Windows operating system program before the data is operated upon.

In the present invention, the CPU 56 again receives an interrupt signal from the buffer 54. Upon receiving the interrupt signal from the buffer 54, the CPU 56 enters into the system management mode of operation. In the system management mode of operation, the CPU 56 accesses a system management program located in the system management memory portion 96b of the main memory. The system management mode of operation, as designed by the manufacturer of the microprocessor 56 is intended solely to "power down" the processor 56 and the entire digital computer 12. However, in the present invention, a software program 70 is written and is stored in the system management memory portion 96b of the main memory 96. Upon receiving the interrupt from the buffer 54, the program from the system management memory 96b is then retrieved by the CPU 56. The program from the system management memory 96b then executes on the data in the buffer 54 by moving them from the buffer 54 into the video memory 98. By bypassing the need to go through the application program, and its associated operating system program under which the application program executes, using the system management mode of operation, greater throughput is achieved.

Unlike the Terminate and Stay Resident (TSR) programs of the prior art, in which a program reside in the same memory as the operating system and application programs, the program residing in the system management memory portion 96b of the main memory 96 is not accessible and cannot be altered by any of the programs (application or operating system) from the access memory 96a.

In another aspect of the present invention, in the prior art, raster scan television devices are able to provide only one channel of audio although it is common to display two or more channels of video, such as in P-I-P. In this mode of operation, the audio signal portion of the audio/video signal 22 from the tuner 18, can be mixed in a mixer 30 with the audio signal portion of another audio/video signal, which is passed through the digital computer 12 by the mixer 30. The output of the mixer 30 is then supplied to an amplifier 64 which is then produced at the speakers 66. In this manner, if for example, the speakers 66 comprise a plurality of stereo sound system, one sound for one of the channels can be directed to, e.g. the left speaker, and another audio signal for a different channel can be directed to, e.g. the right speaker. If the speakers are sufficiently spatially separated, the two channels of sound can be active simultaneously with the display of the two video signals from the two different channels on the display 16. Furthermore, the user can mentally distinguish between these two channels. The following is a listing of the functional specifications for the software 42.

```
d'TV ROM Software Design Document, ro.doc:   v1.1
Darwin Chang, Confidential
(C) 1992, 1993, Copyright Darwin Chang Change History:
date who  description
-----------------------------------------------------
12/22/92dc    created
11/24/93dc    added history
-----------------------------------------------------
```

1.0   Summary 2.0         Existing (Old) Functions
2.1         Ascii A-Z
2.2         Ascii 0-9
2.3         Other Ascii Commands
2.4         Serial Port Protocal 3.0         New Features
3.1         Read Status
3.2         d'TV Button
3.2.1       Read Remote Control Keypad
3.2.2       Enable/Disable Remote Control Command Processing
3.2.3       Remote Control Silkscreen
3.3         Command Parsing
3.3.1       Repeated Commands
3.3.2       Monitor Front Panel Switches
3.4         Sleep
3.4.1       Timer Off Default
3.5         Setup
3.5.1       Video Source (video mode)
3.5.2       Source Selection
3.6         Digicon
3.6.1       Auto
3.7         Lock
3.8         Copyright Notice
3.8.1       Embedded Copyright
3.8.2       Read Copyright
3.9         Default Values 4.0         New Function Summary
4.1         Ascii A-Z, a-z
4.2         Ascii 0-9
4.3         Other Ascii Commands
4.4         Programming Considerations 1.0   Summary The following is a summary of the programming interface for the d'TV project. It is divided into three sections:

- a summary of the old functions,
- a description of the changes or additions to these functions
- and a summary of the new functions.

Changes:

The major change is to expand the #L# read function. Notice the change from ascii data to unsigned integer format.

The source selection functions are replaced to include more choices.

The sleep timer now defaults to disabled.

The use of the Digicon and Setup functions are modified to include new subfunctions.

New Features:

The major addition is to define a readable buffer containing the command stream from the remote control. This requires the redefinition of the "Auto" button on the remote control to a "d'TV" button.

The command processor is restructured to ignore repeated commands only from the remote control and not from the serial port.

There is a lock function to protect against accidental programming to our device.

There is also a new read function to return copyright information.

If there are too many functions to implement, please let me know and I will prioritize the functions.

2.0   Existing (Old) Functions 2.1   Ascii A-Z

A#   Relative channel up (saved channels list)
B#   Relative channel down (saved channels list)

C#   Display channel and time on screen
D#   Sleep timer (use #0#, zero, to increment by 30 minutes)
      on-screen feedback only.

E#   Relative volume up one unit
F#   Relative volume down one unit

G#   reserved
H#   reserved

I#   Power toggle between on and off; use read to find state

J#   Video Source 1, toggle between TV and video1; use read

K#  Video Source 2, toggle between source 1 and VGA; use read

L#  Read status, returns 6 bytes: *abcd* where * is a delimiter
and a, b, c, and d are either ascii 0 or 1:

| description | | 0 | 1 |
|---|---|---|---|
| source1 selection | a | video1 | video2 (tv tuner) |
| source2 selection | b | VGA | source1 |
| power status | c | off | on |
| mute status | d | off | on |

M#  Tuner type; toggle between cable and antenna; no read on screen feedback required

N#  Setup; rotates through options; use with plus and minus commands; no read; on screen feedback required

O#  Mute; toggle; use read

P#  Previous; jump to previous channel

Q#  reserved
R#  reserved

S#  Auto; toggles between preset and user selected colors; no read
T#  Digicon; rotates through options for color, tint, contrast, brightness and sharpness; use plus and minus commands; no read; on screen feedback required

U#  Plus, +; increase parameter; no read; on screen feedback required
V#  Minus, -; decrease parameter; no read; on screen feedback required 2.2  Ascii 0-9

Use the following commands to access tv channels directly:

0#  0
1#  1
2#  2
3#  3
4#  4
5#  5
6#  6

```
#7#   7
#8#   8
#9#   9
```

2.3   Other Ascii Commands

Commands are byte oriented, other values not described are illegal and may cause the system to crash.

2.4   Serial Port Protocal

RS232 switch selectable; Preset to: 9600 baud, odd parity, 7 data bits, 1 stop bit. For example, use:

```
mode com1:  9600,o,7,1
```

3.0   New Features

The basic desire is to achieve the following goals:

> read status - Allow pc read access to d'TV's current state.
> read buffer - Allow pc read access to the remote control keypad.
> read copyright - Allow pc read access to the copyright notice.
> auto, digicon, setup, sleep - Restructure functions.
> lock, unlock - Protect d'TV functions.
> plugged in, power on - define default values.
> rc, serial, front panel - command parsing.

3.1   Read Status

The current read status function, #L#, returns 6 bytes in the format: *abcd* where a, b, c and d are either ascii 0 or 1.

I would like to recommend expanding the read status function #L# to return 8 bytes in the format: *abcdef* where a through f are one byte unsigned integer rather than ascii values. (See list.)

* (ascii 42) remains the delimiter symbol beginning and ending the sequence.

a is a single byte and represents the revision level of this bios code. Any bios changes will force this value to increment.

b is one byte containing 8 single bit flags.  These represent that status of power, mute, tuner type, rc command processing and lock.

c is a single byte and returns a single unsigned integer value representing the video source displayed, including all sources.

d represents the type of any decoders that are active.

e and f are unsigned integer numbers representing the absolute volume level and channel number respectively.

| new description | | | unsigned integer value |
|---|---|---|---|
| delimiter | * | | 42 |
| identification | a | | 1 |
| flags | b | | (see individual bit definitions) |
| power status | b0 | | 0 = off |
| | | | 1 = on |
| mute status | b1 | | 0 = off |
| | | | 1 = on |
| tuner type | b2 | | 0 = antenna |
| | | | 1 = cable tuner |
| rc command processor | b3 | | 0 = disabled |
| | | | 1 = enabled |
| lock/unlock status | b4 | | 0 = unlocked |
| | | | 1 = locked |
| | b5-b7 | | 0, reserved |
| source solection | c | | 0 = VGA |
| | | | 1 = tv tuner |
| | | | 2 = video1 |
| | | | 3 = video2 |
| decoder status | d | | 0 = no decoder |
| | | | 1 = caption decoder displayed |
| | | | 2 = other decoder (optional) |
| volume | e | | 0 <= f <= 99 | channel              f      0 <= g <= 255

3.2 d'TV Button

On the remote control, I would like to relabel the Auto button to d'TV. The Auto function would be moved to a submenu of the Digicon function.

The d'TV button would be used to disable and enable the direct communication of remote control functions directly to the command parsing portion of the rom code.

3.2.1 Read Remote Control Keypad

At all times, the series of commands from the remote control pre-processor will also be stored in a first-in, first-out (fifo) buffer. The size of this buffer is up to the designer and available memory space. I might suggest 8 bytes to experiment with. Commands from the serial port should not be included in the fifo.

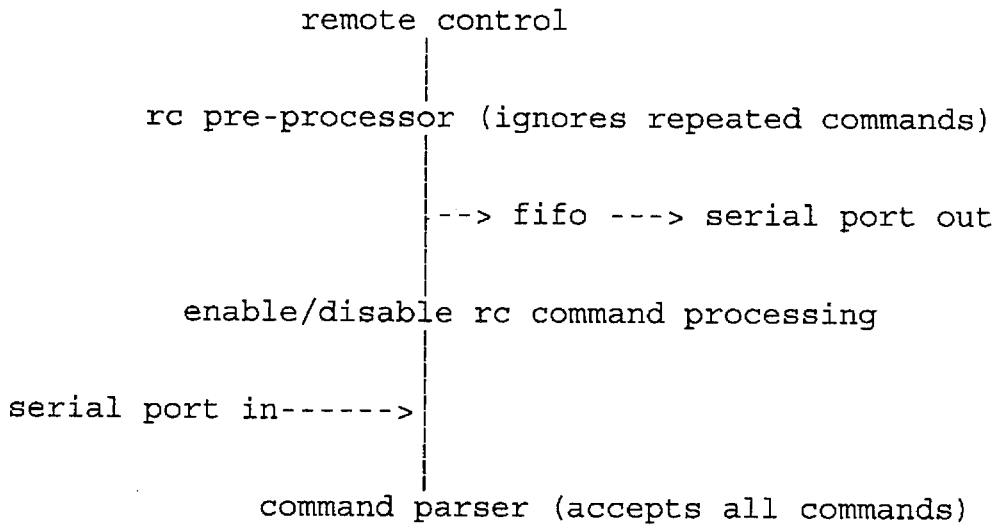

This buffer may be read through the serial port by executing a Read RC command:

Q#   read remote control keypad buffer
      returns:   *data* where:    data is a variable length string of bytes
          maximum length is the buffer size an
          asterisk * preceeds and terminates the
          message Each byte within the string represents a recently pressed button. If the buffer is full, old data is lost and new data is continuously saved.

The * delimiter will be used to terminate the string. Note that the integer value of 42 (which is ascii character *) is reserved as a delimiter symbol.

Every button on the remote shall have an unique number associated (feel free to reassign the values as convient to the programmer):

```
         0 = no command
         1 = 1
         2 = 2
         3 = 3
         4 = 4
         5 = 5
         6 = 6
         7 = 7
         8 = 8
         9 = 9
        10 = 0
        11 = Power
        12 = Channel Up
        13 = Channel Down
        14 = Volume Up
        15 = Volume Down
        16 = Video
        17 = d'TV
        18 = Display
        19 = Mute
        20 = Sleep
        21 = Channel Recall
        22 = Setup
        23 = Digicon
        24 = -
        25 = +
   26 - 41 = reserved
        42 = *, delimiter symbol
  43 - 255 = reserved
```

To clear the remote control buffer, the application program does a read and should throw away the data. The next read, will be new data.

The micro-controller should clear the buffer to all zero values upon execution of a read command. Any zero values indicate no command and should be ignored.

3.2.2 Enable/Disable Remote Control Command Processing

Use these commands to enable and disable direct parsing of the remote control (rc) command stream, by the local micro-controller.

J#  Enable Remote Control Command Processing
K#  Disable Remote Control Command Processing When the rc command processing is disabled, only the d'TV button as described above is active and may enable command processing again.

All other rc buttons are only passed into the fifo buffer and await a read command from the serial interface.

Note that the option to read the fifo buffer is available in both cases: enabled and disabled rc command processing.

In fact, all serial port and front panel functions continue to operate (assuming they are unlocked) regardless of the rc command processing being enabled or disabled.

If the power button is turned off and on, the power on default is to always enable the rc command processing.

3.2.3 Remote Control Silkscreen

If it is possible, I would also like to add some information to the silkscreen of the remote control. I would like to add some additional symbols such as mouse buttons and cursor key labels.

If this is not available, we will just have to go with the existing remote on the first version.

3.3 Command Parsing

Commands come from three different streams: the remote control (rc), the serial port and the front panel switches.

3.3.1 Repeated Commands

The current command loop parses commands from the serial port in the same way as from the infared detector. Since the infared (IR) remote control (RC) repeats commands, the command parser ignores repeated commands.

```
        serial port    remote control
                  \   /
                   \ /
                    V
           command parser (ignores repeated commands)
```

If a command is received through the serial port, it should bypass the IR RC pre-processor and accept repeated commands.

```
                    remote control
                         |
                         |
                    rc pre-processor (ignores
                         repeated commands)
        serial port     /
                  \    /
                   \  /
                    \/
           command parser (accepts all commands)
```

3.3.2  Monitor Front Panel Switches

The following switches should be available from the front of the monitor.

Power
    Channel Up
    Channel Down
    Volume Up
    Volume Down
    Source

The source button rotates between VGA, TV, video1 and video2 as the image displayed on the monitor.

These functions are always active and cannot be disabled.

Other front panel functions are also acceptable. A door or cover is acceptable but not required.

3.4  Sleep 3.4.1  Timer Off Default

Please change the default timer off function to disabled. (The current design has a default timer off function set at 15 minutes.)

The user would have to use the sleep function to select 30, 60, 90, 120 or 0. The 0 value indicates the sleep function is disabled and the d'TV remains on continuously.

3.5  Setup 3.5.1  Video Source (video mode)

Need to bring out a physical button on the front of the computer to select between the various video sources: VGA, TV, video1 and video2.

The subfunction in the setup menu to select a video source (TV/AV) must be expanded to: VGA, TV, video1 and video2.

3.5.2  Source Selection

The previous commands of #J# and #K# are replaced with the following:

a#  Select source VGA
    #b#  Select source tv tuner
    #c#  Select source video 1
    #d#  Select source video 2

3.6  Digicon 3.6.1  Auto

Auto is currently implemented on a direct function key from the remote control. This function sets the color, brightness and other functions to a preset value. The purpose is to redefine this remote control function key to d'TV and move this Auto command to a subfunction of the Setup menu.

Add to the setup onscreen menu, the choice to turn Auto on or off. Use the - and + keys as with the other subfunctions. The sequence would be:

Digicon
    Auto (same function as previous rc button)
    Color
    Tint
    Contrast
    Brightness
    Sharpness 3.7  Lock The purpose of the lock is to protect other programs from accidentally communicating with our d'TV.

G#   Lock
H#   Unlock

When locked, the following functions will continue to operate:

> Remote control functions
> Front panel functions
> All read only functions including:
> #L#, read status
> #Q#, read buffer
> #R#, read copyright
> #H#, the unlock command.

When locked, the following serial port commands will be ignored:

A, B, C, D, E, F, G, I, J, K, M, N, O, P, S, T, U, V, a, b, c, d, 0, 1, 2, 3, 4, 5, 6, 7, 8, 9

New commands should follow this guideline.

The remote control and front panel switches should continue to operate even though the serial port commands are locked out.

3.8   Copyright Notice 3.8.1   Embedded Copyright

Embedded near the beginning of the ROM code should be the ascii string:

(C) 1993, Copyright Darwin Chang and Sanyo Electric

If anyone tries to dump our code, they will see this message.

3.8.2   Read Copyright

There should also be a function to read a copyright notice from the device:

R#   read copyright notice
      returns:   *message* where:  message  is a variable length string of ascii characters the string itself should be null terminated an asterisk * preceeds and terminates the message eg:  *(C) 1993, Copyright Darwin Chang & Sanyo Electric *

The programmer should parse this string for information since it is subject to change from year to year.

3.9  Default Values

There are two types of "power on" situations, one which occurs when the power cord is plugged in and another in which the soft or mechanical power is turned on.  To distinguish these two events, I refer to the first as:

"plugged in"

and the second as:

"power on"

Upon plugging in the power cord, the default values for several items are as indicated in the first column.  Upon turning the power switch off and on, from software or hardware, the default values are as indicated in the second column:

|  | Plugged In | Power On |
|---|---|---|
| mute: | off | off |
| tuner type: | antenna | (last value) |
| rc command buffer: | null | null |
| rc command processing: | enabled | enabled |
| lock/unlock: | unlocked | unlocked |
| source: | TV | (last value) |
| volume: | 26 | (last value) |
| channel: | 2 | (last value) |
| decoder (caption): | no decoder | (last value) |
| sleep timer: | disabled | disabled |
| setup: | factory set | (last value) |
| Digicon: | factory set | (last value) |

4.0  New Function Summary 4.1  Ascii A-Z, a-z

A#  Relative channel up (saved channels list); use read
B#  Relative channel down (saved channels list)
C#  Display channel and time on screen

D# Sleep timer (use #0#, zero, to increment by 30 minutes) on-screen feedback only.

E# Relative volume up one unit; use read
F# Relative volume down one unit

G# Lock; only #H#, #L#, #Q# and #R# serial commands accepted.
H# Unlock; all serial commands accepted.

I# Power toggle between on and off; use read to find state

J# Enable Remote Control Command Processing; use read
K# Disable Remote Control Command Processing

L# Read status, returns 8 bytes in the format: *abcdef* where:

| new description | | | unsigned integer value |
|---|---|---|---|
| delimiter | * | | 42 |
| identification | a | | 1 |
| flags | b | | (see individual bit definitions) |
| power status | | b0 | 0 = off<br>1 = on |
| mute status | | b1 | 0 = off<br>1 = on |
| tuner type | | b2 | 0 = antenna<br>1 = cable tuner |
| rc command processor | | b3 | 0 = disabled<br>1 = enabled |
| lock/unlock status | | b4 | 0 = unlocked<br>1 = locked |
| | | b5-b7 | reserved |
| source selection | c | | 0 = VGA<br>1 = tv tuner<br>2 = video1<br>3 = video2 |
| decoder status | d | | 0 = no decoder |

|  |  |  | 1 = caption decoder displayed |
|--|--|--|--|
|  |  |  | 2 = other decoder (optional) |
| volume | e | $0 <= f <= 99$ | |
| channel | f | $0 <= g <= 255$ | |

M# Tuner type; toggle between cable and antenna; use read

N# Setup; rotates through options; use with plus and minus commands;
no read; on screen feedback required

O# Mute; toggle; use read

P# Previous; jump to previous channel

Q# read remote control keypad buffer; returns:
*data*
where: data is a variable length string of bytes
maximum length is the buffer size
an asterisk * preceeds and terminates the message

R# Read copyright notice string; returns:
*message* where: message is a variable length string of ascii characters the string itself should be null terminated an asterisk * preceeds and terminates the message eg: *(C) 1993, Copyright Darwin Chang & Sanyo Electric *

S# Auto; direct access to toggle between preset and user selected colors; no read; (this serial port command is optional)

T# Digicon; rotates through options for auto, color, tint, contrast, brightness and sharpness; use plus and minus commands; no read; on screen feedback required

U# Plus, +; increase parameter; no read; on screen feedback required

V# Minus, -; decrease parameter; no read; on screen feedback required

W# reserved
X# reserved
Y# reserved
Z# reserved

```
#a#   Select source VGA
#b#   Select source tv tuner
#c#   Select source video 1
#d#   Select source video 2
```

4.2   Ascii 0-9

Use the following commands to access tv channels directly:

```
#0#   0
#1#   1
#2#   2
#3#   3
#4#   4
#5#   5
#6#   6
#7#   7
#8#   8
#9#   9
```

4.3   Other Ascii Commands

Commands are byte oriented, other values not described are illegal and ignored.

4.4   Programming Considerations

When programming, the application must take into consideration that there are other sources of command input besides the serial port. The previous state of the d'TV can not assumed at any time.

The following is a copy of the functional specifications for the software 70.

d'TV Hardware Software Design Document, hw.doc:   v1.1
Darwin Chang, Confidential
(C) 1992, 1993, Copyright Darwin Chang Change History:
date       who   description
---------------------------------------------------
10/5/92    dc    created
11/24/93   dc    added history
---------------------------------------------------

1.0   Hardware Commands

```
#A#   Relative Channel Up (saved channels list)
#B#   Relative Channel Down (saved channels list)
```

C#  Display channel and time on screen
D#  Sleep timer (use #0#, zero, to increment by 30minutes)

E#  Relative Volume Up one unit
F#  Relative Volume Down one unit

G#  reserved
H#  reserved

I#  Power toggle between on and off (sleep); use query to find state

J#  Video Source 1, Toggle between TV(Video0) and Video1; use query
K#  Video Source 2, Toggle between source 1 and VGA; use query

L#  Query Status returns 6 bytes: *abcd* where a, b, c and d are
either ascii 0 or 1:

| Description | | 0 | 1 |
|---|---|---|---|
| source1 selection | a | video1 | video2 (TV tuner) |
| source2 selection | b | VGA | source 1 |
| power status | c | off | on |
| mute status | d | off | on |

M#  Tuner type; Toggle between Cable and Antenna; no query
on screen feedback

N#  Setup; rotates through options use with plus and minus commands;
no query; on screen feedback required

O#  Mute; Toggle; use query

P#  Previous; jump to previous channel

Q#  reserved
R#  reserved

S#  Auto; Toggles between preset and user selected colors; no query
T#  Digicon; rotates through options for color, tint, contrast,
brightness and sharpness; use plus and minus commands;
no query; on screen feedback required

U# Plus, +; increase parameter; no query; on screen feedback required
V# Minus, -; decrease parameter; no query; on screen feedback required 2.0 Direct Channels Use the following commands to access direct channels.

0#
1#
2#
3#
4#
5#
6#
7#
8#
9#

3.0 Serial Port Protocal

RS232 switch selectable; Preset to: 9600 baud, odd parity, 7 data bits,
1 stop bit. For example, use:

mode com1: 9600,o,7,1

4.0 Programming Tips

Repeated commands are rejected due to the nature of the wireless remote
control algorithm. To send channel 11 or 44, or continuously drive the
volume louder, seperate the commands with a query command. For example:

1##L##1#

This will workaround the IR remote command rejection bug.

5.0 Additional Features 5.1 Identification & Serial Numbers

Need an easy way to identify this product. Recommend a solution similar to that used by Intel on x86 processors. We have a product family name, product version number, and a option for a unique serial number.

This will be used at host software initialization time to automatically locate which I/O device is physically connected to the device.

The version information will be used to maintain compatibility and upward migration.

The optional serial number is for future use in networking and software protection. With our without the serial number our software can be protected from unauthorized use with foreign devices.

5.2 Locks and Passwords

The serial command interpreter should have a lock command to protect other applications from accidentally touching our device and creating undersirable effects such as excessively loud volume.

This lock can also be used to stop third party developers from interfacing directly to our hardware and limiting their applications ability to migrate to future versions of our product.

d'TV Remote Control Software Design Document, rc.doc: v1.1
Darwin Chang, Confidential
(C) 1992, 1993, Copyright Darwin Chang Change History:
date    who    description
-----------------------------------------------------
10/5/92    dc    created
11/24/93   dc    added history
                 expanded functions
-----------------------------------------------------

1.0 Remote Control

Note: This may be either a physical device or a logical device. Should expand function for future keyboards, input devices and bi-directional communication to wireless devices.

```
     device = rc_Init (object_name);
   features = rc_GetFeatures (device);
     status = rc_Test (device, data);

data = rc_GetData (device);
     status = rc_SetData (device, data);

status = rc_Write (device, command);
```

```
        ncommand = rc_Read (device, command);

status = rc_SetMode (device, mode);
      mode = rc_GetMode (device);
``` defined modes:   rc_REMOTE2TV   !rc controls d'TV functions (default)
             rc_REMOTE2PC   !rc has no direct control of d'TV

```
    status = rc_Teach (device, data);
```

1.1  Initialize Module

Use this function initialize the device to a default state.

```
        device = rc_Init (object_name);
``` in:  object_name;   physical device name
    out: device;        unique logical device handle

1.2  Get Module Features

Use this function to query the available features of this module.

```
        features = rc_GetFeatures (device);
``` in:  device;          device handle
    out: features; structure of module features

1.3  Test Module

Use this function to test the entire module.

```
        status = rc_Test (device, data);
``` in:  device;      device handle
    in:  data;        parameter list
    out: status;      0 = pass test, or error value

1.4  Set or Get Module Data

Use these functions to read or write module register values.

```
         data = rc_GetData (device);
       status = rc_SetData (device, data);
``` in:  device;      device handle
    in:  data;        structure of data values out: status;          error status 1.5  Read or Write Commands (Data)

Use these functions to read commands issued by the infared remote control. The write command is for future bi-directional use.

```
ncommand = rc_Read (device, command);
  status = rc_Write (device, ncommand, command);
``` in: device;        device handle
    in: command;   data read from remote control
    in: ncommand;  number of bytes in command out: command;   data written to remote device
    out: ncommand;  number of bytes in data
    out: status;         error status 1.6  Set Mode Use this command to set local or interpreted mode of operation. In local mode, the remote control controls the television directly. In interpreted mode, the commands pass through to the computer and the computer must pass an appropriate command to the tv module.

```
status = rc_SetMode (device, mode);
  mode = rc_GetMode (device);
``` in: device;   device handle
    in: mode;     mode of operation defined modes:  rc_REMOTE2TV   !rc controls d'TV functions (default)
        rc_REMOTE2PC   !rc has no direct control of d'TV out: status;         error status 1.7  Teach Remote Control Use this function to program local functions.

```
status = rc_Teach (device, data);
``` in: device;    device handle
    in: data;      structure of data values
    out: status;   error status d'TV Audio Software Design Document, au.doc:  v1.1
Darwin Chang, Confidential
(C) 1992, 1993, Copyright Darwin Chang Change History:
date     who  description
----------------------------------------------------------
10/5/92  dc   created
11/24/93 dc   added history
              added sas mixer functions
----------------------------------------------------------

1.0  Audio
```
       device = au_Init (object_name);
     features = au_GetFeatures (device);
       status = au_Test (device, data);

data = au_GetData (device);
       status = au_SetData (device, data);

status = au_Power (device, on_sleep);
       status = au_SetMasterVolume (device, level);
       status = au_SetVolume (device, level, channel);
       status = au_SetBalance (device, level);
       status = au_SetFader (device, level);
       status =  au_SetEqualizer (device, level,
                   frequency);
       status = au_SetTone (device, bass, treble);
       status = au_Mute (device, on_off);
       status = au_SetSource (device, source);
       status = au_MixerOn_Bypass (device, On_Bypass);
       status = au_MixerSource (device, add_subtract);
     ndevices = au_MixerList (device_list);
```

1.1  Initialize Module

Use this function initialize the device to a default state.

```
       device = au_Init (object_name);
``` in:  object_name;   physical device name
out: device;        unique logical device handle 1.2  Get Module Features Use this function to query the available features of this module.

```
     features = au_GetFeatures (device);
``` in:  device;            device handle
out: features;  structure of module features

1.3 Test Module

Use this function to test the entire module.

status = au_Test (device, data);

in:  device;       device handle
    in:  data;         parameter list
    out: status;       0 = pass test, or error
                       value

1.4 Set or Get Module Data

Use these functions to read or write audio register values.

data   = au_GetData (device);
    status = au_SetData (device, data);

in:  device;       device handle
    in:  data;         structure of data values
    out: status;       error status

1.5 Power status = au_Power (device, on_sleep);

in:  device;       device handle
    in:  on_sleep;     1 = on
                       0 = sleep
    out: status;       error status

1.6 Volume & Balance

The volume of each amplifier determined from the features list may be independently set.

status = au_SetMasterVolume (device, level);
    level  = au_GetMasterVolume (device);

status = au_SetVolume (device, level, channel);
    level  = au_GetVolume (device, channel);

status = au_SetBalance (device, level);
    level  = au_GetBalance (device);

status = au_SetFader (device, level);
    level  = au_GetFader (device);

in:  device;       device handle
    in:  level;        -100 <= level <= 100

```
                    for balance or fader, + is right or forward
         in:    channel;
         for surround sound, channels may be many
         out:   status;          error status
```

1.7    Bass, Treble and Equalization

The number of frequency bands is available from the feature query.

```
         status = au_SetEqualizer (device, nbands,
    levels);
         levels = au_GetEqualizer (device, nbands);

status = au_SetTone (device, bass, mid, treble);
         status = au_GetTone (device, &bass, &mid,
    &treble);

in:   device;    device handle
              in:   nbands;    number of equalizer freq. bands
              in:   levels;    array of levels, -100 <= level[i]
                               <= 100
              in:   bass;      -100 <= bass    <= 100
              in:   mid;       -100 <= mid     <= 100
              in:   treble;    -100 <= treble  <= 100
              out:  status;    error status
```

1.8    Mute

```
         status = au_Mute (device, on_off);
         in:    device;         device handle
         in:    on_off;         1 = mute
                                0 = sound
         out:   status;         error status
```

1.9    Source Selection

The audio source may be selected among one or more inputs.

```
         status = au_SetSource (device, source);
         source = au_GetSource (device);
         in:    device;         device handle
         in:    source;         source number
         out:   status;         error status
```

1.10   Mixer

The audio mixer allows two or more audio sources to be heard
simultaneously.  This may be used for conventional mixing or for sound-and-sound applications for picture-in-picture or
picture-and-picture situations.

```
status    = au_MixerOn_Bypass (device, on_bypass);
status    = au_MixerSource (device, add_subtract);
ndevices  = au_MixerList (device_list);

in:   device;         device handle
in:   on_bypass;      1 = on
                      0 = bypass mixer
in:   add_subtract;   1 = add device to list
                      0 = remove device from list
out:  device_list;    pointer to list of devices
                      currently mixed
out:  ndevices;       number of devices in list
out:  status;         error status
``` d'TV Communications Software Design Document, co.doc:
v1.1
Darwin Chang, Confidential
(C) 1992, 1993, Copyright Darwin Chang Change History:
date      who   description
-----------------------------------------------------
10/5/92   dc    created
11/24/93  dc    added history
                added co_GetData, co_SetData
-----------------------------------------------------

1.0 Communication Port

```
    device   = co_Init (object_name);
  features   = co_GetFeatures (device);
    status   = co_Test (device, data);
      data   = co_GetData (device);
    status   = co_SetData (device, data);
    status   = co_Send (device, data, size);
      size   = co_Receive (device, data);
```

1.1 Initialize Module

Use this function initialize the device to a default state.

```
    device = co_Init (object_name);

in:   object_name;   physical device name
out:  device;        unique logical device handle
```

1.2 Get Module Features

Use this function to query the available features of this module.

```
features = co_GetFeatures (device);

in:  device;           device handle
out: features;  structure of module features
```

1.3 Test Module

Use this function to test the entire module.

```
status = co_Test (device, data);

in:  device;           device handle
in:  data;             parameter list
out: status;           0 = pass test, or error value
```

1.4 Set or Get Module Data

Use these functions to read or write communications register values.

```
data   = co_GetData (device);
status = co_SetData (device, data);

in:  device;           device handle
in:  data;             structure of data values
out: status;           error status
```

1.5 Sending & Receiving Data

Use these functions to actually transmit data to and from a device.

```
status = co_Send (device, data, size);
size   = co_Receive (device, data);

in:  device;           device handle in:  data;             Sent data
in:  size;             Data size in bytes
out: status;           error status out: data;             Received data
out: size;             Data size in bytes
``` d'TV Monitor Software Design Document, mo.doc: v1.1
Darwin Chang, Confidential
(C) 1992, 1993, Copyright Darwin Chang Change History:

```
date  who  description
-----------------------------------------------------
10/5/92   dc   created
11/24/93  dc   added history
               expanded functions
               added programmable resolution for
future use
-----------------------------------------------------
```

This module controls one or more display devices
including the LCD PAP
and main CRT display.

1.0  Monitor

```
   device = mo_Init (object_name);
 features = mo_GetFeatures (device);
   status = mo_Test (device, data);
     data = mo_GetData (device);
   status = mo_SetData (device, data);
   status = mo_Power (device, on_off);
   status = mo_SetSource (device, source);
   status =     mo_ProgramResolution (device,
                   resolution);
resolution = mo_GetResolution (device);
```

1.1 Initialize Module

Use this function initialize the device to a default state.

```
        device = mo_Init (object_name);
``` in:  object_name;   physical device name
   out: device;        unique logical device handle 1.2 Get Module Features Use this function to query the available features of this module.

```
        features = mo_GetFeatures (device);
``` in:  device;        device handle
   out: features;      structure of module features 1.3 Test Module Use this function to test the entire module.

```
        status = mo_Test (device, data);
``` in:  device;        device handle

```
in: data;              parameter list
out: status;           0 = pass test, or error
                       value
```

1.4 Set or Get Module Data

Use these functions to read or write monitor register values.

```
     data = mo_GetData (device);
   status = mo_SetData (device, data);

in: device;            device handle
in: data;              structure of data values
out: status;           error status
```

1.5 Power

```
   status = mo_Power (device, on_sleep);

in: device;            device handle
in: on_sleep;          1 = on
                       0 = sleep
out: status;           error status
```

1.6 Source Selection

The video source may be selected among one or more inputs.

```
   status = mo_SetSource (device, source);
   source = mo_GetSource (device);

in: device;            device handle
in: source;            source number
out: status;           error status
```

1.7 Programming Resolutions

Future function to custom program the parameters characterizing a
particular resolution.

```
     status =     mo_ProgramResolution (device,
                  resolution);
   resolution = mo_GetResolution (device);

in: device;            device handle
in: resolution;        structure containing new
                       parameters
out: resolution;       structure containing current
                       parameters
out: status;           error status
``` d'TV Security Software Design Document, se.doc: v1.1
Darwin Chang, Confidential
(C) 1992, 1993, Copyright Darwin Chang Change History:
date     who   description
----------------------------------------------------
10/5/92  dc    created
11/24/93 dc    added history
               expanded functions
----------------------------------------------------

1.0   Security

```
    device   = se_Init (object_name);
    features = se_GetFeatures (device);
    status   = se_Test (device, data);

status   = se_Lock (device);
    status   = se_Unlock (device);
```

1.1   Initialize Module

Use this function initialize the device to a default state.

```
    device = se_Init (object_name);
``` in:  object_name;   physical device name
    out: device;        unique logical device handle 1.2   Get Module Features Use this function to query the available features of this module.

```
    features = se_GetFeatures (device);
``` in:  device;        device handle
    out: features;      structure of module features 1.3   Test Module Use this function to test the entire module.

```
    status = se_Test (device, data);
``` in:  device;        device handle
    in:  data;          parameter list
    out: status;        0 = pass test, or error
                        value 1.4   Lock & Unlock Device Use this function to lock out accidental programming of this device.

```
    status = se_Lock (device);
    status = se_Unlock (device);

in:  device;       device handle
    out: status;       0 = pass test, or error value
``` d'TV Television Tuner Software Design Document,
tv.doc:  v1.2
Darwin Chang, Confidential
(C) 1992, 1993, Copyright Darwin Chang Change History:
date who   description
---------------------------------------------------------------
10/5/92    dc    created
12/16/92dc       expanded functions
11/24/93dc       added history
---------------------------------------------------------------

1.0   Tuner Module

```
        device = tv_Init (object_name);
      features = tv_GetFeatures (device);
        status = tv_Test (device, data);

data = tv_GetData (device);
        status = tv_SetData (device, data);

status = tv_Power (device, on_sleep);
      channel = tv_GetChannel (device);
       status = tv_SetChannel (device, channel);
      channel = tv_ChannelUp (device);
      channel = tv_ChannelDown (device);

channel = tv_ProgramMode (device, on_off);
       status = tv_SaveMemory (device, channel, list);
       status = tv_DeleteMemory (device, channel, list);
      channel = tv_MemoryUp (device, list);
      channel = tv_MemoryDown (device, list);
      channel = tv_Jump (device);

status = tv_Caption (device, on_off);
       status = tv_Decode (device, scheme);
```

1.1   Initialize Module

Use this function initialize the device to a default state.

device = tv_Init (object_name);

in:  object_name;   physical device name
    out: device;        unique logical device handle 1.2  Get Module Features Use this function to query the available features of this module.

features = tv_GetFeatures (device);

in:  device;    device handle
    out: features;  structure of module features 1.3  Test Module Use this function to test the entire module.

status = tv_Test (device, data);

in:  device;   device handle
    in:  data;     parameter list
    out: status;   0 = pass test, or error value 1.4  Set or Get Module Data Use these functions to read or write tuner register values.

data   = tv_GetData (device);
    status = tv_SetData (device, data);

in:  device;   device handle
    in:  data;     structure of data values
    out: status;   error status 1.5  Power status = tv_Power (device, on_sleep);

in:  device;      device handle
    in:  on_sleep;    1 = on
                      0 = sleep
    out: status;      error status 1.6 Channel Selection All cable and terrestial channels may be accessed using this group of functions. For advanced features, see Favorite Channels.

```
channel = tv_GetChannel (device);
 status = tv_SetChannel (device, channel);
channel = tv_ChannelUp (device);
channel = tv_ChannelDown (device);

in:  device;         device handle
in:  channel;   1 <= channel <= 181
out: channel;   -1 = error
out: status;         error status
```

1.7 Favorite Channels

Quick access to favorite channels is accessable via abreviated lists and previous channel memory (jump). These lists are user programmable.

Actual implementation of this function may be completely in software. The remote control actions may be trapped, interpreted and the appropriate action taken, bypassing the default rc functions.

```
channel = tv_ProgramMode (device, on_off);
 status = tv_SaveMemory (device, channel, list);
 status = tv_DeleteMemory (device, channel, list);
channel = tv_MemoryUp (device, list);
channel = tv_MemoryDown (device, list);
channel = tv_Jump (device);

in:  device;         device handle
in:  on_off;         1 = programming mode on
                     0 = off
in:  channel;   1 <= channel <= 181
out: channel;   -1 = error
in:  list;           list pointer for multiple
                     favorite lists
out: status;         error status
```

1.8  Decoders

1.8.1  Closed Caption Decoder

The US FCC requires that all TV's manufactured after July 1, 1993 to include a closed caption decoder for the hearing impaired.

```
status = tv_Caption (device, on_off);

in:  device;         device handle
```

```
in:  on_off;         1 = display caption on
                         screen
                     0 = do not display captions
out: status;         error status
```

1.8.2 Cable Decoder/Decryption

Used to select between TV or cable ready tuner. Option for a cable television decoder to descramble or decompress signals.

```
    status = tv_Decode (device, scheme);

in:  device;         device handle
in:  scheme;    0 = standard TV antenna decoder
                1 = 181 channel cable tuner
                2 = descrambler A
                3 = descrambler B
                4 = descrambler C
                n = descrambler x
out: status;    error status
```

From the foregoing, it can be seen that a video signal controller, operating with a computer monitor and a computer, can display conventional television signals without interrupting or taking away the processing capabilities of the digital computer 12 as in the prior art. Furthermore, the computer 12 can display P-I-P type images with substantially reduced overhead.

I claim:

1. A video signal controller for use with a digital computer generating a first video signal having a first sync rate, and a video display means for receiving an output video signal and for displaying said output video signal, said controller comprising:

tuner means for producing a second video signal having a second sync rate, different from the first sync rate;

a first multiplexer means for receiving a first input video signal and a second input video signal and for outputting said output video signal to said display means, said output video signal is either said first or second input video signal, in response to a first control signal;

first means for supplying said first video signal having the first sync rate, to said first multiplexer means as said first input video signal thereof;

second means for supplying said second video signal having said second sync rate, to said first multiplexer means as said second input video signal thereof; and control means for generating said first control signal supplied to said first multiplexer means.

2. The controller of claim 1 wherein said control means further comprises:

means for communicating with the digital computer and for supplying commands thereto for controlling the digital computer.

3. The controller of claim 2 wherein said digital computer executes a software program responsive to said commands from said control means.

4. The controller of claim 2 further comprising:

portable control means for transmitting a command signal to said control means; and wherein said control means further comprises means for receiving said command signal.

5. The controller of claim 1 wherein said second means further comprises:

a second multiplexer means for receiving said second video signal and a third video signal and generating said second input video signal in response to a second control signal.

6. The controller of claim 5 wherein said control means generates said second control signal supplied to said second multiplexer means.

7. The controller of claim 1 further comprising:

means for digitizing said second video signal to produce a digitized second video signal; and means for supplying said digitized second video signal to said digital computer.

8. The controller of claim 7 wherein said digital computer executes a software program to process said digitized second video signal to form a processed second video signal and to generate said first video signal with said processed second video signal being a portion thereof.

9. The controller of claim 1 wherein said first input video signal has a first sync rate and said second input video signal has a second sync rate and wherein said video display means being adapted to display said output video signal having one of a plurality of possible sync rates.

10. The controller of claim 1 further comprising a second display means for receiving said second video signal and for displaying said second video signal while said first video signal is displayed by said video display means.

11. The controller of claim 1 wherein said tuner means further comprises means for producing a plurality of different video signals, each having an associated audio signal.

12. The controller of claim 11 further comprising a second display means for receiving one of said plurality of different video signals and for displaying one of said plurality of different video signals while another of said plurality of video signals is displayed by said video display means.

13. The controller of claim 12 further comprising means for generating different audio sounds from each of the different audio signals associated with each of said plurality of different video signals.

14. A display system for use with a digital computer generating a first video signal having a first sync rate, said system comprising:

a display means for receiving a display video signal having one of a plurality of sync rates and adapted to display said display video signal;

means for generating a second video signal having a second sync rate, different from the first sync rate;

first multiplexer means having a first input and a second input and an output, said first multiplexer means responsive to a first control signal for connecting said first input or said second input to said output;

means for connecting said output of said first multiplexer to said display means;

first means for supplying said first video signal to said first input of said first multiplexer means;

second means for supplying said second video signal to said second input of said first multiplexer means; and control means for generating said first control signal supplied to said first multiplexer means.

15. The system of claim 14 wherein said control means further comprises:

means for communicating with the digital computer and for supplying commands thereto for controlling the digital computer.

16. The system of claim 15 wherein said digital computer executes a software program responsive to said commands from said control means.

17. The system of claim 15 further comprising:

portable control means for transmitting a command signal to said control means; and wherein said control means further comprises means for receiving said command signal.

18. The system of claim 14 wherein said second means further comprises:

a second multiplexer means for receiving said second video signal and a third video signal and generates said second input video signal in response to a second control signal.

19. The system of claim 18 wherein said control means generates said second control signal supplied to said second multiplexer means.

20. The system of claim 14 further comprising:

means for digitizing said second video signal to produce a digitized second video signal; and means for supplying said digitized second video signal to said digital computer.

21. The system of claim 20 wherein said digital computer executes a software program to process said digitized second video signal to form a processed second video signal and to generate said first video signal with said processed second video signal being a portion thereof.

22. The system of claim 14 wherein said means for generating said second video signal having said second sync rate, generates a plurality of different second video signals, each having a second sync rate and each having an associated audio signal.

23. The system of claim 22 further comprising a second display means for receiving one of said second video signals and for displaying said one second video signal while another of said second video signals is displayed by said display means.

24. The system of claim 23 further comprising means for generating different audio sounds from each of the different audio signals associated with each of said plurality of different second video signals.

25. The system of claim 14 further comprising a second display means for receiving said second video signal and for displaying said second video signal while said first video signal is displayed by said display means.

26. A method of displaying a plurality of video signals, each having a different sync rate, said method comprising:

generating a first video signal having a first sync rate by a digital computer means;

generating a broadcast signal having a second sync rate, different from said first sync rate, by a tuner means;

converting said broadcast video signal into a second video signal;

supplying said first and second video signals to a switch means;

outputting the video signal of said switch means to a display means for display; and switching said switch means to provide either said first video signal or said second video signal to said display means for display.

27. The method of claim 26 further comprising:

processing said broadcast video signal by said digital computer means to produce a processed video signal; and incorporating said processed video signal in said first video signal.

28. A video display apparatus for displaying a plurality of video signals, each having a different sync rate, said apparatus adapted to display a first video signal having a first sync rate generated by a digital computer means, said apparatus comprising:

tuner means for generating a broadcast video signal having a second sync rate, different from the first sync rate;

means for converting said broadcast video signal into a second video signal having said second sync rate;

a switch means responsive to a control signal, for receiving said first and second video signals and for providing either said first or said second video signals as an output signal thereof;

display means for receiving said output signal and for displaying said output signal; and means for generating said control signal supplied to said switch means.

29. The apparatus of claim 28 wherein said broadcast video signal is supplied to said digital computer.

30. The apparatus of claim 29 wherein said digital computer includes means for processing said broadcast video signal to produce a processed video signal and means for incorporating said processed video signal in said first video signal.

* * * * *